Sept. 19, 1950  E. K. IRVINE  2,523,215
BATTERY MASTER SWITCH
Filed May 10, 1948  2 Sheets-Sheet 1
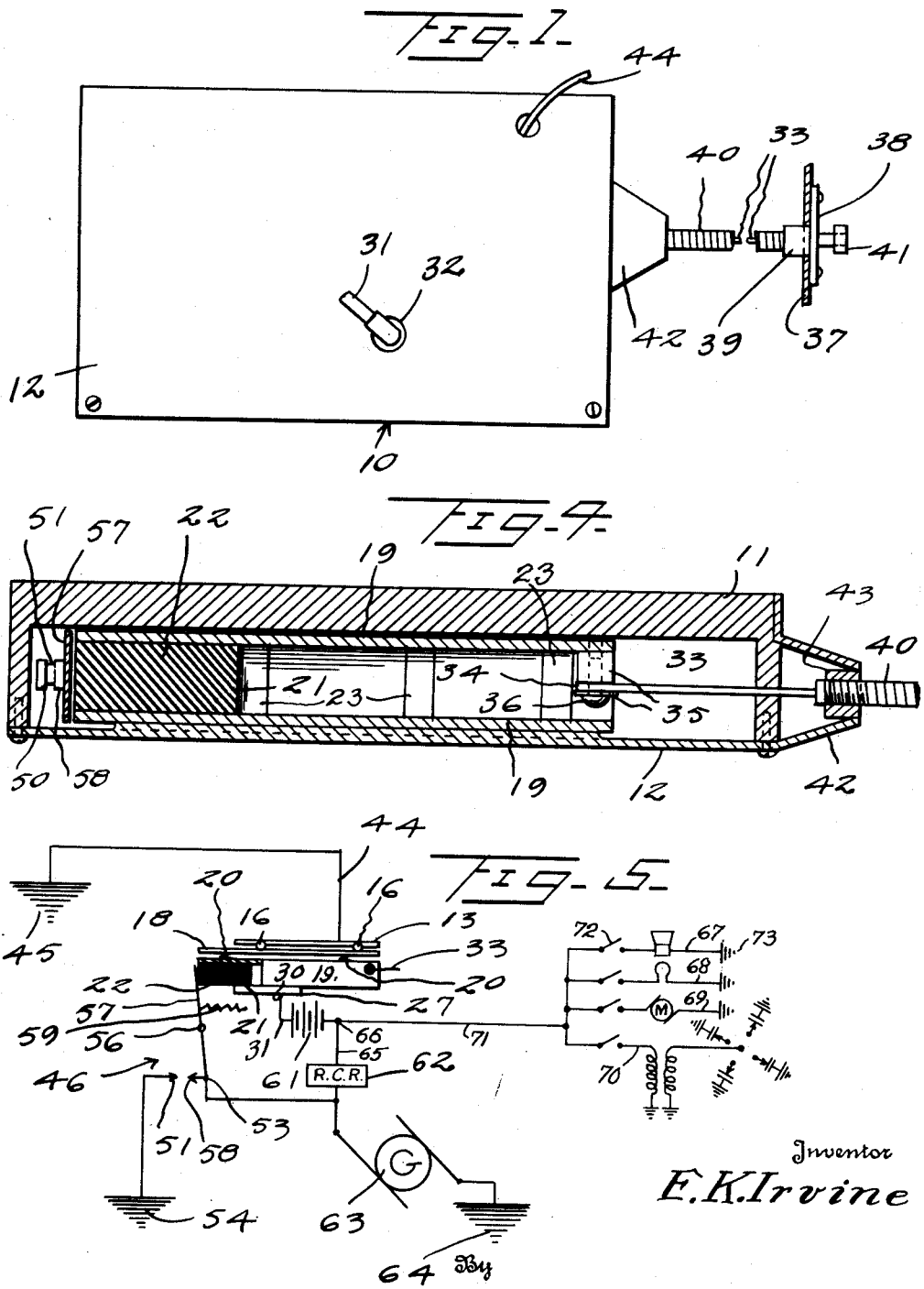

Sept. 19, 1950  E. K. IRVINE  2,523,215
BATTERY MASTER SWITCH
Filed May 10, 1948  2 Sheets-Sheet 2
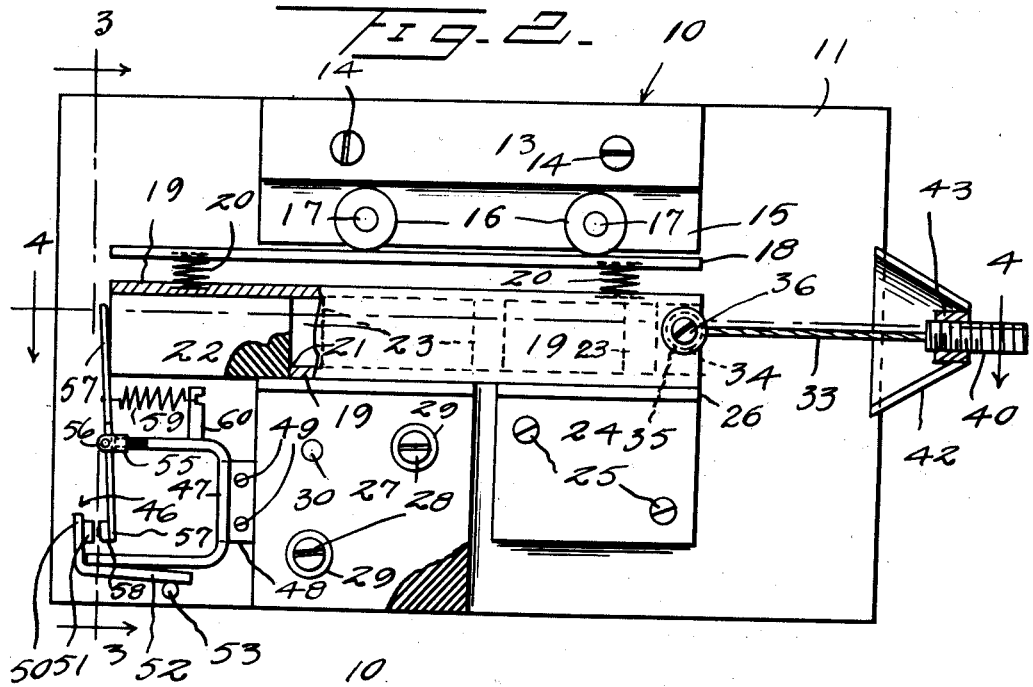
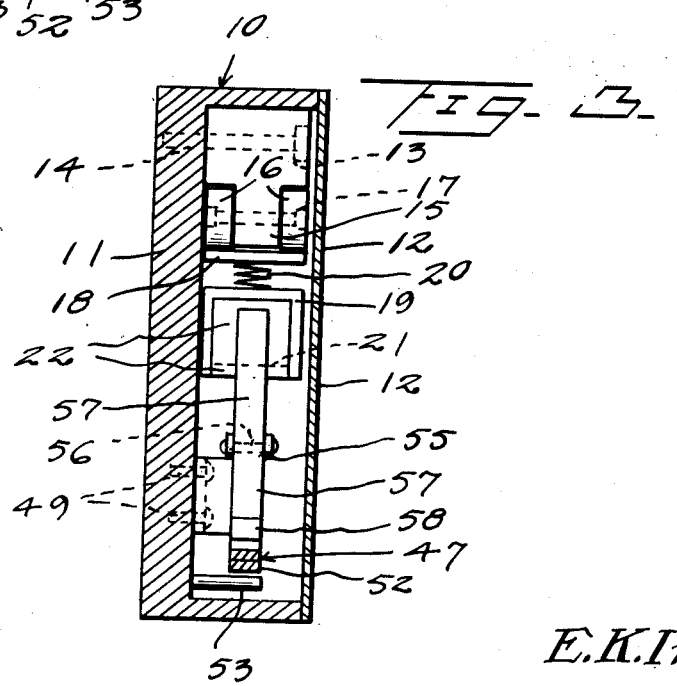
Inventor
E. K. Irvine
By
Kimmel & Crowell  Attorneys Patented Sept. 19, 1950

2,523,215

UNITED STATES PATENT OFFICE 2,523,215

BATTERY MASTER SWITCH

Edwin K. Irvine, Tampa, Fla.

Application May 10, 1948, Serial No. 26,152

4 Claims. (Cl. 290—37)

This invention relates to a battery master switch designed to be used in connection with the ignition and lighting system or circuit of an automobile or the like to prevent drain on the battery while the car is parked or standing still and to prevent a short from starting a fire, as well as to prevent charging of the battery and over-charging thereof on long trips by disconnecting or throwing out the generator, in addition to preventing discharge and waste of the battery by making it impossible for children to blow the horn, turn on the lights or use the starter.

Another object of the invention is to provide a switch interposed in an electrical circuit of the automobile and operated from the dash or instrument board or panel so that all current from the battery may be cut off or the generator rendered inoperative while being towed, coasting down hill with the battery or ignition switch off or the battery from being discharged from any cause while being parked or standing or while a mechanic is working on the car or electrical system thereof, and also to prevent drain on the battery from unauthorized attempts such as of children to operate the horn, turn on the lights or using the starter.

With the above and other objects in view, my invention consists in the arrangement, combination and details of construction disclosed in the drawings and specification, and then more particularly pointed out in the appended claims.

In the drawings,

Figure 1 is an elevation of a battery master switch constructed in accordance with my invention, Figure 2 is a view similar to Figure 1 with the switch cover removed, Figures 3 and 4 are vertical and longitudinal sectional views taken on the lines 3—3 and 4—4 respectively of Figure 2; and Figure 5 is a diagrammatic view of the wiring employing the switch.

Referring to the drawings, 10 designates the battery master switch which is mounted in a housing 11 which may take the form of an insulation or fiber plate or casing on which a cover 12 is detachably mounted in any suitable manner. Attached to the back or base of a housing which may be constituted by the plate 11, is a metallic plate 13 as by means of suitable fastenings such as screws 14 and disposed between or intermediately of the ends of the base, back plate or housing 11. The plate 13 may be provided with a central reduced bottom flange 15 and has mounted upon one or both faces thereof a plurality, preferably two rollers 16, the pivots or shafts 17 of which are carried by the plate 13. The rollers 16 bear upon a flat strip or track 18 secured to a movable contact or switch plunger 19 so as to move therewith longitudinally of the housing and having interposed therebetween, compression springs 20. The springs 20 are disposed between the top of the plunger 19 and the strip or track 18 so as to normally press the latter against the rollers which are preferably of metal such as steel, copper bronze or other good electrical conductor so that the current will not only be transferred but the plunger will slide easier. The plunger may be of tubular formation, such as rectangular or other cross section with flat top and bottom walls, and one end is cut out at the bottom as indicated at 21, namely the inner end so as to form an inverted U or channel-shaped formation in cross section at this end in which is inserted and held an insulation or fiber block 22 of a cross section corresponding to that of the plunger at its interior dimension. The plunger may also be reinforced internally between the top and bottom flat walls thereof as indicated at 23 as by suitable strips connected at suitable intervals to insure better conduction or transference of electrical current.

At the bottom, the bottom wall of the plunger engages frictionally with a plate 24 secured by suitable fastening such as screws 25 to the base 11 in spaced parallel relation beneath the plate 13 and provided with a lateral right angular flange 26 at the top on which the plunger slides, the springs 20 insuring proper frictional contact therewith under the spring tension thus provided.

Also secured to the base 11 against the same or inner face thereof to which the plate 13 is secured, is an insulated block or contact plate 27, the securing means such as screws 28 being insulated from the block or plate 27 as indicated at 29. A post 30 extends from the plate 27 for connection of the usual ground wire cable 31 of the battery as commonly employed in connection with the ignition and lighting systems of automobiles and is arranged to extend through the cover 12 which has an opening 32 for this purpose. The switch is preferably mounted on the frame of the automobile or motor as near as possible to the battery and the plunger and contact plates preferably constructed of steel or brass, except for the insulation or fiber parts as described. The front end of the plunger opposite the block or plug 22 has connection with a push and pull or Bowden wire cable 33 having one end 34 coiled around an insulated sleeve or bushing 35 to insulate the same from a fastening or screw 36 attaching one end of the cable to the plunger. The opposite end of the cable extends through the instrument panel or dashboard 37 of the automobile, through a bracket plate 38 having a sleeve 39 with a suitable bushing in which the flexible tube or housing 40 of the cable is connected and provided with a projecting knob 41 by which the cable may be manipulated, that is pushed in or pulled out. The opposite end of the tube or housing 40 is anchored in a shield or bracket 42 suitably mounted or fixed at the front end of the switch housing and formed therewith if desired. This bracket is shown as a frusto-conical or tapered member in which the tube or housing 40 is disposed and held as by means of a clamping nut 43, so that the cable may be shifted lengthwise therein to slide the plunger 19 in and out.

Extending from the plate 13 is a wire or cable 44 which is connected to the frame to ground same as at 45 in the electrical system of the automobile shown diagrammatically in Figure 5 of the drawings. In back of the plate 27, a spring contact switch 46 is mounted on the base 11 within the housing 12 and comprises a bracket arm 47 of substantially U-shaped form disposed with its legs horizontally and attached to the base in any suitable manner as by means of extension plate 48 and fastening means or screws 49. The lower arm of the bracket 47 extends rearwardly and has an upwardly bent end 50 on which is provided a contact 51. This contact is fixed and has an arm 52 extending into engagement with a post 53 connected to the ground as indicated at 54. The other or upper arm of the bracket 47 adjustably mounts a pivot bearing 55 which is insulated from the bracket and has pivoted thereon at 56, a movable pivoted contact or lever 57 carrying a movable contact 58 for engagement with the contact or point 51. The upper arm of the pivoted contact or lever 57 is connected to a spring 59 having its opposite end anchored to the base or an arm 60 projecting up from the bracket 47 to normally hold the contact point 58 in engagement with the point 51 while the upper end of the lever arm is engaged by the inner end of the plunger 19 and is not sufficiently wide to straddle the metallic tubular part of the plunger but adapted to be engaged by the inserted fiber or insulation block or plug 22. The battery 61 is connected to the insulated contact block or plate 27 at post 30 through cable 31 and is connected to the reverse current relay or cutout indicated at 62 by a conductor 65 extending from terminal 66 or the "hot" side of the battery. The horn circuit 67, lighting circuit 68, starter circuit 69, having a starter motor M, and an ignition circuit 70 are also connected by a common supply cable 71 to the "hot" terminal 66 as is conventional practice. All of these circuits are of conventional design and include suitable switch means as at 72 and are individually grounded as at 73. The reverse current relay or cutout 62 is connected to the generator 63 and the contact 51 is connected through post 53 to the generator side of the reverse current relay, the generator being indicated at 63 and grounded to the frame of the automobile as indicated at 64.

Thus, by having the insulation block 22 in the inner end of the plunger 19 of such length and proportions to the movable contact formed by plunger 19, it may engage the contact plate 27 at its forward end and at the same time engage the pivoted contact lever 57 so as to disengage the contact point 58 from the contact point 51 by merely pushing on the knob 41 so as to disconnect the generator from ground 54 at the switch provided. However, when the plunger is pulled to the right, about 1½-inches in the device made in accordance with the invention, the block 22 only, engages the contact plate 27 so as to cut off all current from the battery and at the same time permit the contact point 58 to engage the contact point 51 under the urgence of the spring 59 so as to close the switch at this point to the generator and thereby ground the generator to prevent burning out while the automobile is being towed or while coasting down hill with the battery or ignition switch off. By pulling the plunger inwardly ¼-inch through the medium of the knob 41 and cable 33, the block 22 will move out of engagement with the switch lever 57, permit switch 46 to close by engagement of points 51 and 58 under biasing of spring 59, so that no charging or further charging of the battery will take place, especially on long trips or to prevent over-charging, due to the shunting, shorting or grounding of the generator while maintaining the ignition circuit 70 from the battery through the plunger switch through plunger or movable contact 19 and contacts 27 and 13. Normally when the knob 41 and plunger are pushed rearwardly or in, normal operation of the ignition system will take place as switch 46 is open by reason of contacts 51 and 58 being separated against the action or tension of spring 59 as seen in Figure 1, and as the plunger is held in frictional engagement with both the plates 24 and 27, the contacts are kept clean by reason of the biasing or tension springs 20 so that good electrical connection is insured, while at the same time the anti-friction bearings or rollers 16 insure ease of operation by reason of the plunger moving against said rollers. The metal cover over the switch protects the interior parts from foreign matter such as water or grit and when the switch is pulled out to move the insulated block 22 over the contact plate 27 insulated from the other parts as described, the device is useful in preventing unauthorized persons or children from blowing the horn, turning on the lights, or using the starter and thus wasting or discharging the battery. On the other hand, by opening the switch by pulling the plunger so that the insulation block 22 is disposed over the contact plate 27 all current from the battery is cut off and at the same time, the contact points are engaged to close the switch to the generator so that the latter is grounded to prevent it from burning out while in gear and being towed or coasting down hill with the battery or ignition switch off. When the car is parked or standing it will prevent the battery from being discharged for any cause such as a short in the circuit and will act as a protective measure for the benefit of a mechanic working on the car or electrical system. On long trips, over-charging will be prevented by grounding the generator so that no further charging will take place, nor the battery burned out.

I do not mean to confine myself to the exact details of construction herein disclosed but claim all variations falling within the purview of the appended claims.

What I claim is:

1. In an electrical system for automobiles having a battery, and an ignition circuit directly connected to said battery, a generator grounded to the frame of the automobile, and a reverse current relay interposed in an electrical conductor between the battery and the generator, a normally closed switch connected to said conductor between the reverse current relay and the generator and also grounded to the frame, a pair of stationary contacts, one connected to the battery, and the other also grounded to the frame, a movable contact in the form of a plunger engaging said stationary contacts and movable between the same, a section of insulation at the inner end of the plunger and adapted to engage said normally closed switch when the plunger is in position to bridge said stationary contacts, and thus to open said normally closed switch, whereby the circuit through the generator and battery is closed to charge the battery, and whereby when the plunger is moved slightly in one direction, said normally closed switch is adapted to close to connect the generator directly to the frame, and in another position said plunger is adapted when pulled out to dispose the insulation section between said stationary contacts, to break the circuit therebetween from the battery to the ignition circuit, and also to disengage said normally closed switch to cause the same to close and ground the generator directly to the frame.

2. An electrical system for automobiles including a generator, a reverse current relay and a battery in series connection, and an ignition circuit directly connected to said battery, and a master battery switch comprising a housing, a metallic plunger movable in the housing and provided with an insulation block at one end of the plunger and exposed at one face thereof, a pair of stationary contacts between which said plunger is movable, said plunger adapted to engage one of said contacts in one position, and to engage said block therewith in another position independently of the metallic part of the plunger, contact rollers carried by the other one of said stationary contacts, said other one of said stationary contacts being connected to ground, a spring pressed contact carried by the plunger and resiliently urged against said rollers, a switch interposed in an electrical conductor extending from said system between said generator and said reverse current relay to ground and mounted in the housing at the end of the plunger provided with the insulation block and having a stationary contact and a movable contact normally engaged with the stationary contact, said movable contact positioned to be engaged by the insulation block when the plunger is in position to bridge the gap between the stationary contacts to open the said interposed switch by causing movement of the movable contact of the said interposed switch away from the stationary contact thereof, and in another position said plunger being adapted to dispose said insulation block between the first named stationary contacts whereby the ignition circuit is broken and the movable contact of the said interposed switch is normally engaged with the stationary contact thereof for grounding the generator, and means for sliding said plunger.

3. In an automobile electrical system including a generator, a reverse current relay, a battery and an ignition circuit connected directly to said battery, a master battery switch comprising a first switch including a pair of fixed spaced apart contacts interposed in said system between said battery and ground, a plunger movable between said fixed contacts and having electrically conducting and insulating portions thereon, and a normally closed second switch interposed in an electrical conductor extending from said system between said generator and said relay to ground, said second switch including a movable contact carrier positioned to be engaged by said plunger for opening said second switch, said plunger, in one position thereof, being adapted to close the circuit through said fixed contacts by contact of said conducting portions therewith and to engage said movable contact carrier for opening said second switch, and in another position thereof, to break the circuit between said battery and ground and disengage said movable contact carrier to close said second switch for grounding said generator.

4. In an electrical system for automobiles, including a generator, a reverse current relay, a battery and an ignition circuit connected directly to said battery, spaced stationary contacts interposed between said battery and ground, an elongated movable contact slidable between and engaging said stationary contacts, a length of insulation mounted on said movable contact and adapted in one position of the latter to engage one of said stationary contacts to break the circuit between said battery and said ignition circuit, and a spring-pressed normally closed switch having a fixed and a rockable contact interposed in an electrical conductor leading from the system between said generator and said reverse current relay to ground, said latter switch including a rockable contact carrier positioned to be engaged by said length of insulation in another position thereof for breaking the circuit from said generator through said electrical conductor to ground, said elongated movable contact in said latter position being adapted to close the circuit between said spaced stationary contacts.

EDWIN K. IRVINE.

REFERENCES CITED

The following references are of record in the file of this patent:

UNITED STATES PATENTS

| Number | Name | Date |
|---|---|---|
| Re. 14,842 | Delano | Apr. 20, 1920 |
| 1,034,561 | Apple | Aug. 6, 1912 |
| 1,205,010 | Pearson | Nov. 14, 1916 |
| 1,248,375 | Morrison et al. | Nov. 27, 1917 |
| 1,301,053 | Heany | Apr. 15, 1919 |
| 1,404,890 | Patten | Jan. 31, 1922 |
| 1,507,266 | Whittingham | Sept. 2, 1924 |
| 1,656,584 | Hemingway, Jr. | Jan. 17, 1928 |
| 1,658,911 | Varley | Feb. 24, 1928 |
| 1,709,717 | Geraghty | Apr. 16, 1929 |
| 1,719,539 | Fought et al. | July 2, 1929 |
| 1,736,991 | Adam | Nov. 26, 1929 |
| 1,740,895 | Kilgour | Dec. 24, 1929 |
| 1,936,535 | Albertson | Nov. 21, 1933 |
| 1,950,194 | Samad | Mar. 6, 1934 |
| 1,952,667 | Geraghty | Mar. 27, 1934 |
| 1,995,780 | Phillips | Mar. 26, 1935 |
| 2,067,125 | Hosking | Jan. 5, 1937 |
| 2,185,071 | Alcoran | Dec. 26, 1939 |
| 2,203,326 | Douglas | June 4, 1940 |